United States Patent Office 3,433,856
Patented Mar. 18, 1969

3,433,856
HALOGEN AND HYDROXY CONTAINING
PHOSPHONATES
Lester Friedman, Beachwood, Ohio, assignor to Weston
Chemical Corporation, Newark, N.J., a corporation of
New Jersey
No Drawing. Filed Dec. 2, 1965, Ser. No. 511,215
U.S. Cl. 260—932                          29 Claims
Int. Cl. C07f 9/40, 9/08; C07d 105/04

ABSTRACT OF THE DISCLOSURE

Compounds are prepared having the formulae

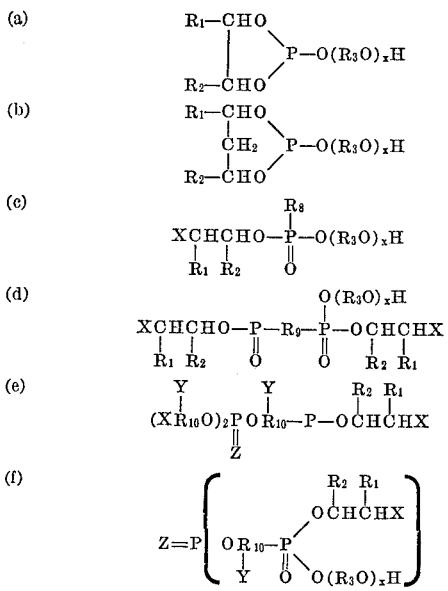

where $R_1$ and $R_2$ are hydrogen or lower alkyl, $R_3$ is lower alkylene of at least 2 carbon atoms, $x$ is an integer of at least 2, $R_8$ is alkyl, alkenyl, aralkyl, haloaralkyl, cycloalkenyl-alkyl and halocycloalkenylalkyl, X is halogen of atomic weight 35 to 127, $R_9$ is divalent hydrocarbon or divalent halohydrocarbon, Y is hydrogen or halogen of atomic weight 35 to 127, $R_{10}$ is 2 to 4 carbon alkylene and Z is nothing or oxygen. The compounds are useful to improve the flame resistance of polyurethanes and as stabilizers for halogen containing polymers and olefin polymers.

---

This invention relates to novel phosphorus containing compounds.

Chlorine and phosphorus containing compounds are very effective flame retardant additives for polyurethanes based on cost and efficiency. One shortcoming of the currently commercially available additives is that they lack site functionality and are unable to become chemically bound to the polymer matrix. Instead they are retained in the polymer on the basis of solution compatibility, a situation that sometimes leads to sweating, i.e. the diffusion of the additive to the surface of the polymer.

An object of the present invention is to overcome these shortcomings.

Another object is to prepare novel phosphorus compounds.

An additional object is to prepare novel phosphorus and halogen containing compounds.

Yet another object is to improve the flame resistance of polyurethanes.

A still further object is to develop stabilizers for halogen containing polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained in several fashions.

In one aspect of the invention there are prepared compounds having the formula

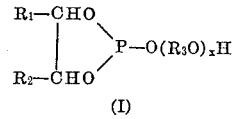

(I)

where $R_1$ and $R_2$ are hydrogen or lower alkyl $R_3$ is a lower alkylene group, preferably of 2 to 4 carbons, and $x$ is an integer of at least 2 and is preferably a low integer, e.g. 2, 3 or 4.

The compounds of Formula I are conveniently prepared by reacting equimolar amounts of a vicinal glycol, a polyalkylene glycol and a tertiary phosphite of the formula

where $R_4$, $R_5$ and $R_6$ are hydrocarbyl, e.g. alkyl or aryl, or haloaryl, and removing the monohydric alcohol or phenol formed by distillation. The reaction is preferably carried out in the presence of an alkaline catalyst or a dihydrocarbyl or dihaloaryl phosphite catalyst.

Examples of compounds within Formula I are dipropylene glycol ethylene phosphite (also called 2-hydroxypropoxypropoxy - 1,3,2 - dioxaphospholane), dipropylene glycol propylene phosphite (also called 2-hydroxypropoxypropoxy-4-methyl-1,3,2 - dioxaphospholane), diethylene glycol ethylene phosphite, diethylene glycol propylene phosphite, tripropylene glycol ethylene phosphite, tripropylene glycol propylene phosphite, tetrapropylene glycol propylene phosphite, polypropylene glycol molecular weight 2025 ethylene phosphite, 2-hydroxypropoxypropoxy-4,5-dimethyl-1,3,2-dioxaphospholane, 2-hydroxypropoxypropoxy-4-ethyl-1,3,2-dioxaphospholane, 2-hydroxypropoxypropoxy-4-propyl-1,3,2-dioxaphospholane, 2-hydroxypropoxypropoxy - 4,5 - diethyl - 1,3,2 - dioxaphospholane.

Another class of compounds within the present invention are compounds having the formula

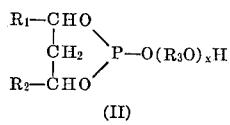

(II)

where $R_1$, $R_2$, $R_3$ and $x$ are as defined above. The compounds of Formula II are prepared in the same manner as those of Formula I but using a 1,3-type glycol rather than a vicinal glycol. Examples of compounds within Formula II are dipropylene glycol trimethylene phosphite (also called 2-hydroxypropoxypropoxy-1,3,2-dioxaphosphorinane), dipropylene glycol 1,3-butylene phosphite (also called 2-hydroxypropoxypropoxy-4-methyl-1,3,2-dioxaphosphorinane), diethylene glycol trimethylene phosphite, tripropylene glycol trimethylene phosphite, polypropylene glycol molecular weight 2025 trimethylene phosphite, 2-hydroxypropoxypropoxy-4,6-dimethyl-1,3,2-dioxaphosphorinane, 2-hydroxypropoxypropoxy-4-methyl-6-propyl-1,3,2-dioxaphosphorinane, 2-hydroxypropoxypropoxy-4,6-diethyl-1,3,2-dioxaphosphorinane.

As starting vicinal glycols for making the phosphites of Formula I there can be used ethylene glycol, propylene glycol, 2,3-butylene glycol, 1,2-butylene glycol, 1,2-pentanediol, 3,4-hexanediol, etc.

As starting 1,3-glycols for making the phosphites of Formula II there can be used trimethylene glycol, 1,3-butylene glycol, 2,4-pentanediol, 2,4-heptanediol, etc.

As polyalkylene glycols for making the compounds of Formulae I and II there can be used diethylene glycol, dipropylene glycol, ditetramethylene glycol, tripropylene glycol, triethylene glycol, tetrapropylene glycol, polypropylene glycol molecular weight 2025 etc.

As the tertiary phosphite used to make the compounds of Formulae I and II there can be used trimethyl phosphite, triethyl phosphite, tripropyl phosphite, triamyl phosphite, tris octyl phosphite, tris isodecyl phosphite, tris dodecyl phosphite, tris octadecyl phosphite, triphenyl phosphite, tri o-cresyl phosphite, tri-p-cresyl phosphite, tri-m-cresyl phosphite, tri-xylenyl phosphite, phenyl diisodecyl phosphite, diphenyl p-chlorophenyl phosphite, tri p-chlorophenyl phosphite, tri-o-chlorophenyl phosphite.

Examples of suitable catalysts are dialkyl or diaryl or dihaloaryl phosphites such as diphenyl phosphite, di-o-cresyl phosphite, di-p-cresyl phosphite, didecyl phosphite, diisodecyl phosphite, dioctadecyl phosphite, dimethyl phosphite, diethyl phosphite, di-o-chlorophenyl phosphite, di-2,4-dichlorophenyl phosphite or alkaline catalysts such as sodium phenolate, sodium methylate, sodium cresylate, potassium phenolate, sodium isodecylate. The alkaline catalysts preferably have a pH of at least 11 in an 0.1 N aqueous solution. The catalyst is normally used in an amount of 0.05–5% by weight of the phosphite reactant.

An alternative way of preparing the compounds of Formulae I and II is to react a 2-aryloxy or 2-alkoxy 1,3,2-dioxaphospholane or 2-aryloxy or 2-alkoxy 1,3,2-dioxaphosphorinane with an equimolar amount of a polyalkylene glycol in the presence of a catalyst as above specified.

The compounds of Formula II are useful in amounts of 0.1–10% by weight of the polymer as stabilizers against light and polymer degradation for polyvinyl chloride, and other vinyl chloride polymers, e.g. vinyl chloride-vinylidene chloride copolymer (80:20), vinyl chloride-vinyl acetate (87:13), vinyl chloride - acrylonitrile (85:15). In the same proportions they are also stabilizers for monoolefin polymers such as polyethylene, polypropylene, ethylene-propylene copolymers (e.g. 50:50, 80:20 and 20:80), ethylene monoolefin copolymers wherein the monoolefin has 4–10 carbon atoms and is present in a minor amount, e.g. ethylene butene-1 copolymer (e.g. 95:5) and ethylene-decene-1 copolymer. Furthermore, they can be used in the same amounts to stabilize natural rubber, styrene-butadiene rubber, ethylene-propylene-nonconjugated diene terpolymers, e.g. ethylene-propylene-dicyclopentadiene terpolymer (e.g. 57:42:3).

Because the compounds of Formula II have a stable dioxaphosphorinane ring they do not ring open readily and cannot be used in the Arbuzov reaction. They can be employed as reactive flame retardants for polyurethanes because they have a hydroxyl group which can take part in the reaction as a chain stopper.

The compounds of Formula I can also be employed as reactive flame retardants for polyurethanes due to their free hydroxyl group.

However, the compounds of Formula I are most valuable because they do ring open in the Arbuzov reaction. The halogen from the Arbuzov reagent becomes incorporated in the molecule upon ring opening and their is no by-product.

For maximum yields the compounds of Formula I are reacted with the Arbuzov reagent in a molar ratio of 1 mole of the Formula I compound for each reactive halogen on the Arbuzov reagent. However, less Arbuzov reagent can be used with lower yield of product.

The Arbuzov reaction is normally carried out by heating, usually between 100 and 200° C., preferably at 125–150° C.

The Arbuzov reaction for forming one type of product of the invention is as follows

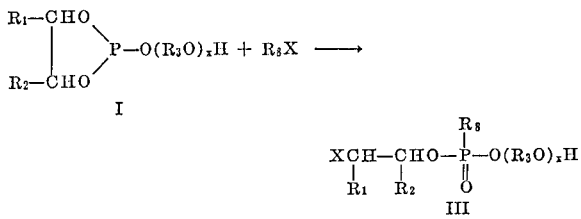

where $R_1$, $R_2$, $R_3$ and $x$ are as defined as above and X is chlorine, bromine or iodine and $R_8$ is alkyl, alkenyl, aralkyl, haloaralkyl, cycloalkenyl alkyl or halocycloalkenyl alkyl.

Examples of suitable $R_8X$ compounds are methyl chloride, methyl bromide, methyl iodide, ethyl chloride, ethyl bromide, ethyl iodide, propyl chloride, isopropyl bromide, amyl chloride, butyl chloride, amyl bromide amyl iodide, hexyl chloride, octyl chloride, octyl bromide octyl iodide, dodecyl chloride, dodecyl bromide, dodecyl iodide, hexadecyl chloride, octadecyl chloride, octadecyl bromide, octadecyl iodide, allyl chloride, allyl bromide, allyl iodide octadecenyl chloride (oleyl chloride), benzyl chloride, benzyl bromide, benzyl iodide, methallyl chloride, methallyl iodide, methallyl bromide, crotyl chloride, crotyl bromide, 2,4,6-trichlorobenzyl chloride, 2,4,6-trichlorobenzyl bromide, 2,4,6-tribromobenzyl bromide, 2-chlorobenzyl chloride, 2-chloromethyl 1,4,5,6,7,7 - hexachlorobicycloheptene (having the formula

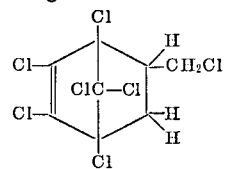

and prepared by heating equimolar amounts of allyl chloride and hexachloro cyclopentadiene), 2 - chloromethylbicycloheptene.

Examples of compounds within Formula III are dipropylene glycol 2-chloroethyl methane phosphonate (also called 2-hydroxypropoxypropoxy 2'-chloroethoxy methane phosphonate), dipropylene glycol 2-bromoethyl methane phosphonate, dipropylene glycol 2-iodoethyl methane phosphonate, dipropylene glycol 2-bromopropyl methane phosphonate, dipropylene glycol 2-chloropropyl methane phosphonate, dipropylene glycol 2-iodopropyl methane phosphonate, dipropylene glycol 2-chloropropyl ethane phosphonate, diethylene glycol 2-bromopropyl ethane phosphonate, tripropylene glycol 2-bromopropyl ethane phosphonate, dipropylene glycol 2-chloroethyl ethane phosphonate, tetrapropylene glycol 2-chloropropyl ethane phosphonate, dipropylene glycol 2- chloroethyl propane phosphonate, dipropylene glycol 2-bromopropyl propane phosphonate, dipropylene glycol 2-chloroethyl butane phosphonate, dipropylene glycol 2-chloroethyl pentane phosphonate, diethylene glycol 2-bromopropyl pentane phosphonate, ditetramethylene glycol 2-chloroethyl pentane phosphonate, dipropylene glycol 2-chloro-1-methylpropyl pentane phosphonate, dipropylene glycol 2-bromo-1 - ethylethyl pentane phosphonate, diethylene glycol 2 - iodoethyl pentane phosphonate, dipropylene glycol 2 - chloroethyl hexane phosphonate, triethylene glycol 2-chloropropyl hexane phosphonate, dipropylene glycol 2-chloropropyl octane phosphonate, dipropylene glycol 2-bromopropyl octane phosphonate, dipropylene glycol 2-chloroethyl dodecane phosphonate, dipropylene glycol 2-bromopropyl dodecane phosphonate, diethylene glycol 2-chloroethyl hexadecane phosphonate, dipropylene glycol 2 - chloropropyl octadecane phosphonate, dipropylene glycol 2-bromoethyl octadecane phosphonate, polypropylene glycol molecular weight 2025 2-chloroethyl pentane phosphonate, dipropylene glycol 2-chloroethyl propene phosphonate, diethylene glycol 2-bromoethyl propene phosphonate, dipropylene glycol 2-chloropropyl propene phosphonate, dipropylene glycol 2-chloroethyl 2'-methylpropene phosphonate, dipropylene glycol 2-chloropropyl octadecene phosphonate, dipropylene glycol 2-bromoethyl octadecene phosphonate, dipropylene glycol 2-chloromethyl phenylmethane phosphonate, dipropylene glycol 2-chloropropyl phenylmethane phosphonate, dipropylene glycol 2-bromoethyl phenylmethane phosphonate, diethylene glycol 2-chloroethyl phenylmethane phosphonate, dipropylene glycol 2-chloroethyl 2', 4', 6'-trichlorophenylmethane phosphonate, dipropylene glycol 2-chloroethyl bicycloheptenylmethane phosphonate, dipropylene glycol 2'-chloroethyl 1,4,5,6,7,7 - hexachloro - bicycloheptenylmethane phosphonate (having the formula

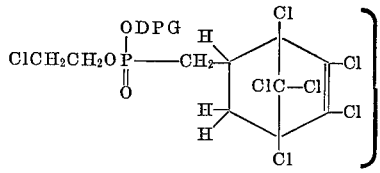

dipropylene glycol 2'-chloropropyl 1,4,5,6,7,7-hexachlorobicycloheptenylmethane phosphonate.

According to the invention there can also be employed the Arbuzov reaction to react the compounds of Formula I with Arbuzov reagents having two reactive halogen atoms. In such case if two moles of the compound of Formula I are reacted with one mole of the Arbuzov reagent a bis phosphonate is formed. However, if only one mole of the compound of Formula I is employed there will be formed a monophosphonate having a haloalkyl substitute. The equation for the reaction is as follows:

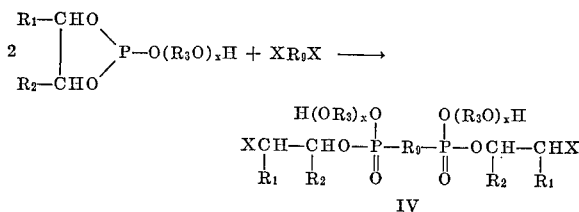

wherein $R_1$, $R_2$, $R_3$, X and $x$ are as defined above and $R_9$ is a divalent hydrocarbon or halohydrocarbon group wherein the two free valences are attached to aliphatic carbon atoms. Preferably the $XR_9X$ compound either has halogen atoms, most preferably chlorine or bromine in addition to the Arbuzov reactive halogen atoms or has aliphatic unsaturation which can be eliminated through addition of chlorine or bromine across the double or triple carbon to carbon bond. Such a reacton is shown in the following equation where DPG stands for dipropylene glycol with one OH removed.

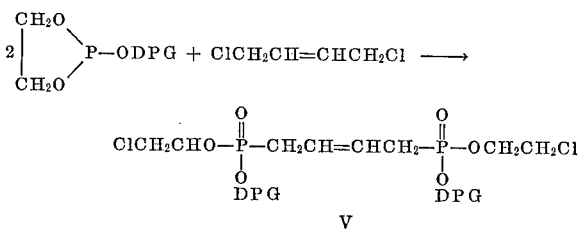

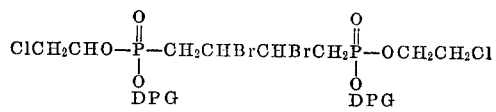

By replacing the bromine by chlorine in this reaction the corresponding compound having 4 chlorine atoms is formed.

A similar reaction can be carried out by replacing the 1,4-dichlorobutene by 1,4-dichlorobutyne. In such case the final product will have either 2 chlorine atoms and 4 bromine atoms or will have 6 chlorine atoms depending on whether bromine or chlorine is used to react across the triple bond.

Examples of compounds having the formula $XR_9X$ are 1,4-dichlorobutene, (both cis and trans isomers as well as a mixture of such isomers), 1,4-dichlorobutyne, 1,4-dibromobutene, 1,4-dichlorobutane, 1,4-dibromobutane, xylylene dichloride, tetrachloroxylylene dichloride, tetrabromoxylylene dibromide, 2,3-di(chloromethyl) 1,4,5,6,-7,7-hexachloro-5-norbornene (HET dichloride).

Examples of compounds within Formula IV are butane bis (dipropylene glycol 2-chloroethyl phosphonate), butene bis (dipropylene glycol 2-chloroethyl phosphonate), butene bis (dipropylene glycol 2-chloropropyl phosphonate), butene bis (diethylene glycol 2-chloroethyl phosphonate), butene bis (dipropylene glycol 2-bromoethyl phosphonate), 2,3-dichlorobutene bis (diethylene glycol 2'-chloroethyl phosphonate), 2,3-dichlorobutene bis (dipropylene glycol 2'-chloroethyl phosphonate), 2,3-dichlorobutene bis (dipropylene glycol 2'-chloropropyl phosphonate), 2,3-dichlorobutene bis (dipropylene glycol 2'-bromopropyl phosphonate), 2,3-dichlorobutene bis (tripropylene glycol 2'-chloroethyl phosphonate), 2,3-dibromobutene bis (dipropylene glycol 2'-chloroethyl phosphonate), 2,3-dibromobutene bis (dipropylene glycol 2'-bromopropyl phosphonate), 2,3-dibromobutene bis (diethylene glycol 2'-bromoethyl phosphonate), 2,3-dichlorobutane bis (diethylene glycol 2'-chloropropyl phosphonate), 2,3-dichlorobutane bis (dipropylene glycol 2'-chloroethyl phosphonate), 2,3-dichlorobutane bis (dipropylene glycol 2'-chloropropyl phosphonate), 2,3-dichlorobutane bis (dipropylene glycol 2'-bromopropyl phosphonate), 2,3-dichlorobutane bis (tripropylene glycol 2'-chloroethyl phosphonate), 2,3-dibromobutane bis (dipropylene glycol 2'-bromopropyl phosphonate), 2,3-dibromobutane bis (diethyl glycol 2'-bromethyl phosphonate), 2,2,3,3-tetrachlorobutane bis (dipropylene glycol 2'-chloroethyl phosphonate), 2,2,3,3-tetrachlorobutane bis (diethylene glycol 2'-chloropropyl phosphonate), 2,2-3,3-tetrabromobutane bis (dipropylene glycol 2'-chloroethyl phosphonate), 2,2,3,3-tetrabromobutane bis (dipropylene glycol 2'-bromoethyl phosphonate), xylylene bis (dipropylene glycol 2-chloroethyl phosphonate), xylylene bis (dipropylene glycol 2'-chloropropyl phosphonate), xylylene bis (diethylene glycol 2'-chloroethyl phosphonate), xylylene bis (dipropylene glycol 2'-bromoethyl phosphonate), tetrachloroxylylene bis (dipropylene glycol 2-chloroethyl phosphonate), tetrachloroxylylene bis (dipropylene glycol 2-chloropropyl phosphonate), tetrabromoxylylene bis( dipropylene glycol 2-bromoethyl phosphonate), tetrachloroxylylene bis (diethylene glycol 2-chloroethyl phosphonate), HET bis (dipropylene glycol 2-chloroethyl phosphonate) having the formula

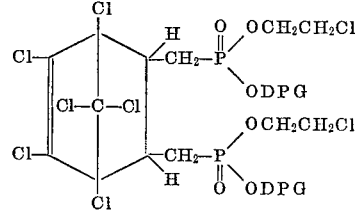

HET bis (dipropylene glycol 2-bromoethyl phosphonate), HET bis (dipropylene glycol 2-chloropropyl phosphonate), HET bis (diethylene glycol 2-chloroethyl phosphonate), HET bis (tetrapropylene glycol 2-chloroethyl phosphonate).

Also according to the invention there can be employed the Arbuzov reaction to react compounds of Formula I with tertiary mono and dihaloalkyl phosphites and phosphates wherein the haloalkyl groups have 2 to 4 carbon atoms. If 1 mole of the tris (haloalkyl) phosphite or phosphate is reacted with 1 mole of the compound of Formula I there is produced a compound having the formula

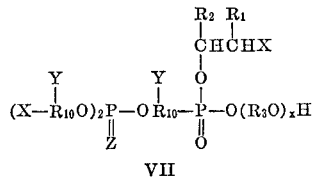

VII where $R_1$, $R_2$, X and $x$ are as previously defined, Y is halogen or hydrogen, $R_{10}$ is a 2 to 4 carbon alkylene group and Z is oxygen or nothing.

On the other hand if 1 mole of the tertiary mono or dihaloalkyl phosphite or phosphate is reacted with 3 moles of a compound of Formula I in the Arbuzov reaction then there is formed a product having the formula

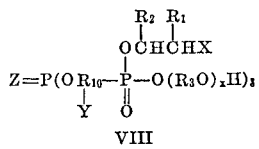

VIII where X, Y, $R_1$, $R_2$, $R_{10}$, Z, $R_3$ and $x$ are as defined above.

Illustrative starting phosphites and phosphates for preparing the compounds of Formulae VII and VIII are tris (3,3-dichloropropyl) phosphite, tris (3,3-dichloropropyl) phosphate, tris (2,3-dichloropropyl) phosphite, tris (2,3-dichloropropyl) phosphate, tris (4,4-dichlorobutyl) phosphite, tirs (4,4-dichlorobutyl) phosphate, tris (2,2-dichloroethyl) phosphate, tris (1,2-dichloroethyl) phosphate, tris (1,2-dichloroethyl) phosphite, tris (1,2dichloroethyl) phosphate, tris (3-chloropropyl) phosphite, tris (3-chloropropyl) phosphate, tris (4 - chlorobutyl) phosphite, tris (4-clorobutyl) phosphate, tris (2-chloroethyl) phosphite, tris (2-chloroethyl) phosphate, tris (2-chloropropyl) phosphite, tris (2-bromoethyl) phosphate, tris (3-bromopropyl) phosphite, tris (2,2-dibromoethyl) phosphate.

Examples of compounds within Formula VII are bis (2-chloroethyl) phosphato dipropylene glycol 2'-chloroethyl ethane phosphonate (having the formula

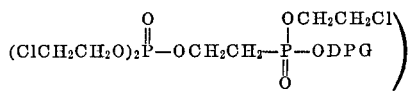

bis (2-chloroethyl) phosphito dipropylene glycol 2'-chloroethyl ethane phosphonate, bis (2-bromoethyl) phosphato dipropylene glycol 2'-bromoethyl ethane phosphonate, bis (3-chloropropyl) phosphato diethylene glycol 2'-chloroethyl propane phosphonate, bis (4-chlorobutyl) phosphito dipropylene glycol 2'-chloroethyl butane phosphonate, bis (2,2-dichloroethyl) phosphato dipropylene glycol 2'-chloroethyl butane phosphonate, bis (3,3-dichloropropyl) phosphito tripropylene glycol 2'-chloroethyl propane phosphonate, bis (3-chloropropyl) phosphito dipropylene glycol 2'-chloroisopropyl propane phosphonate (having the formula

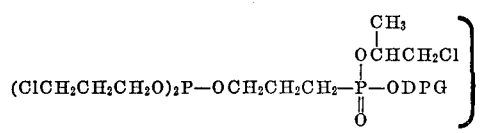

bis (2-cloroethyl) phosphate dipropylene glycol 2'-chloroethyl ethane phosphonate, bis (2-chloroethyl) phosphito diethylene glycol 2'-chloroethyl ethane phosphonate.

Examples of compounds within Formula VIII are tris (dipropylene glycol 2-chloroethyl phosphonatoethyl) phosphate (having the formula

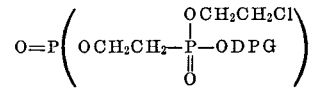

tris dipropylene glycol 2-chloroethyl phosphonato ethyl) phosphite, tris (diethylene glycol 2-chloroethyl phosphonatoethyl) phosphate, tris (dipropylene glycol 2-bromoethyl phosphonatoethyl) phosphite, tris (dipropylene glycol 2-chloroisopropyl phosphonatoethyl) phosphate, tris (dipropylene glycol 2-chloroisopropyl phosphonatoethyl) phosphite, tris (dipropylene glycol 2-chloroethyl phosphonato 1'-chloroethyl) phosphate, tris (dipropylene glycol 2-chloroethyl phosphonatopropyl) phosphite, tris (tripropylene glycol 2-chloroethyl phosphonatopropyl) phosphate, tris (dipropylene glycol 2-chloroisopropyl phosphonatobutyl) phosphate.

The compounds of Formulae III, IV, VII and VIII are all useful as flame retardant additives for polyurethanes. Since they all contain a free hydroxyl group they can be chemically bound to the polymer matrix if they are added, for example, along with the polyol employed in making the polyurethane. The compounds of Formulae III and VII can be used to control the polymer chain growth as chain stoppers since they have only a single hydroxyl group. The compounds of Formulae IV and VII on the other hand contain a plurality of hydroxyl groups and hence can contribute to the overall increase in chain length. In fact they can be used as the sole polyol, e.g. to react with toluene diisocyanate to form a polyurethane.

The compounds of Formulae III, IV, VII and VIII can also be added to polyurethane prepolymers to give flame retardant properties to the composition. They also are useful as flame retardant agents for polyesters, e.g. styrene modified dipropylene glycol maleate adipate, and can be added as reactants prior to the formation of the polyester. They also are useful as flame retardants for hydrocarbon polymers such as polyethylene, polypropylene, ethylene-propylene-unconjugated diene terpolymers, etc.

Unless otherwise indicated all parts and percentages are by weight.

Example 1

A mixture of 76 grams (1 mole) of propylene glycol, 134 grams (1 mole) of dipropylene glycol, 310 grams (1 mole) of triphenyl phosphite and 5 grams of sodium phenate (catalyst) to keep the system basic was heated to 120–150° C. at 15 mm. Hg pressure. The phenol formed via the transesterification reaction was removed through a 10 plate fractionating column. Towards the end of the reaction the pressure was lowered to 1–2 mm. to facilitate complete removal of the phenol. The residual liquid after treatment with Attagel (attapulgus clay) and Hi-Flo (filter aid), followed by filtration at 75° C. was dipropylene glycol propylene phosphite, a clear, water-white liquid of the following structure

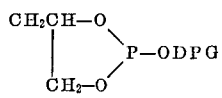

Ultraviolet analysis indicated that no more than 0.5% phenol was present.

Example 2

The procedure of Example 1 was repeated replacing the propylene glycol by 1 mole of ethylene glycol to produce dipropylene glycol ethylene phosphite, a liquid having the formula

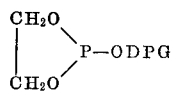

Example 3

The procedure of Example 1 was repeated replacing the propylene glycol by 1 mole of trimethylene glycol to produce dipropylene glycol trimethylene phosphite, a liquid having the formula

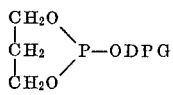

Example 4

1 mole of dipropylene glycol propylene phosphite as prepared in Example 1 was heated with 1 mole of amyl chloride at 130° C. for 4 hours to form dipropylene glycol 2-chloropropyl pentane phosphonate, a liquid having the formula

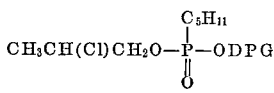

Example 5

1 mole of dipropylene glycol ethylene phosphite as prepared in Example 2 was heated with 1 mole of octyl bromide at 130° C. for 4 hours to form dipropylene glycol 2-bromoethyl octane phosphonate as a liquid.

Example 6

1 mole of dipropylene glycol ethylene phosphite was heated with 1 mole of allyl chloride at 130° C. for 4 hours to form dipropylene glycol 2-chloroethyl propene phosphonate, a liquid having the formula

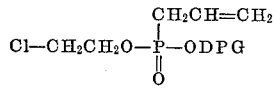

The product added bromine across the double bond to give dipropylene glycol 2-chloroethyl - 2′,3′ - dibromopropane phosphonate.

Example 7

1 mole of dipropylene glycol ethylene phosphite was heated with 1 mole of benzyl bromide for 4 hours at 135° C. to form dipropylene glycol 2-chloroethyl phenylmethane phosphonate, a liquid having the formula

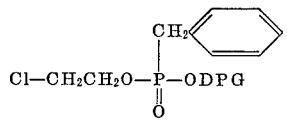

Example 8

1 mole of dipropylene glycol ethylene phosphite was heated with 1 mole of 2-chloromethyl 1,4,5,6,7,7-hexachlorobicycloheptene (HET monochloride) for 4 hours at 135° C. to form dipropylene glycol 2-chloroethyl 1,4,5,6,7,7-hexachlorobicycloheptenyl methane phosphonate.

Example 9

2 moles of dipropylene glycol propylene phosphite was heated with 1 mole of 1,4-dichlorobutene at 130° C. for 4 hours to form butene bis (dipropylene glycol 2-chloropropyl phosphonate) as a liquid.
This compound reacted with chlorine to produce 2,3-dichlorobutane bis (dipropylene glycol 2′-chloropropyl phosphonate).

Example 10

2 moles of dipropylene glycol ethylene phosphite was heated with 1 mole of 1,4-dibromobutene at 130° C. for 4 hours to form butene bis (dipropylene glycol 2-bromoethyl phosphonate) as a liquid having the formula

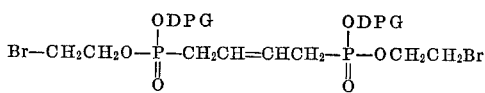

This product readily added 1 mole of bromine across the double bond to form 2,3-dibromobutane bis (dipropylene glycol 2-bromoethyl phosphonate).

Example 11

2 moles of dipropylene glycol ethylene phosphite was heated with 1 mole of 1,4-dichlorobutyne at 130° C. for 4 hours to form butyne bis (dipropylene glycol 2-chloroethyl phosphonate) as a liquid.
This product readily added 2 moles of bromine across the triple bond to form 2,2,3,3-tetrabromobutane bis (dipropylene glycol 2′-chloroethyl phosphonate).

Example 12

2 moles of dipropylene glycol ethylene phosphite was heated with 1 mole of tetrachloroxylylene dichloride at 140° C. for 4 hours to produce tetrachloroxylylene bis (dipropylene glycol 2-chloroethyl phosphonate) as a liquid having the formula

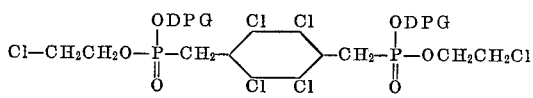

Example 13

2 moles of diethylene glycol propylene phosphite was heated with 1 mole of tetrabromoxylylene dibromide at 140° C. for 4 hours to produce tetrabromoxylylene bis (diethylene glycol 2-bromopropyl phosphonate) as a liquid.

Example 14

2 moles of dipropylene glycol ethylene phosphite was heated with 1 mole of HET dichloride at 140° C. for 4 hours to produce HET bis (dipropylene glycol 2-chloroethyl phosphonate) as a liquid.

Example 15

1 mole of tris (2-chloroethyl) phosphate and 1 mole of dipropylene glycol ethylene phosphite were heated at 125–150° C. for 3 hours to give bis (2-chloroethyl) phosphato dipropylene glycol 2′-chloroethyl ethane phosphonate as a light pale yellow liquid.

Example 16

1 mole of tris (2-bromoethyl) phosphite and 1 mole of dipropylene glycol propylene phosphite were heated at 140° C. for 3 hours to give bis (2-bromoethyl) phosphito dipropylene glycol 2′-bromoisopropyl ethane phosphonate as a liquid.

Example 17

1 mole of tris (2-chloroethyl) phosphite and 3 moles of dipropylene glycol ethylene phosphite were heated at 125–150° C. for 4 hours to give tris (dipropylene glycol 2-chloroethyl phosphonatoethyl) phosphate as a liquid.

Example 18

1 mole of tris (2-bromoethyl) phosphite and 3 moles of dipropylene glycol ethylene phosphite were heated at 140° C. for 4 hours to give tris (dipropylene glycol 2-bromomethyl phosphonatoethyl) phosphate as a liquid.

I claim:
1. A compound having a formula selected from the group consisting of

(a)

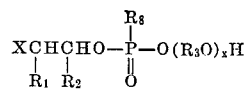

and (b) 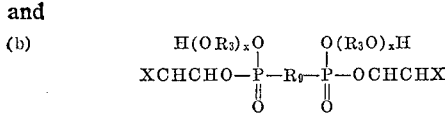

where $R_1$ and $R_2$ are selected from the group consisting of hydrogen and lower alkyl, $R_3$ is a lower alkylene group of at least 2 carbon atoms, $R_8$ is selected from the group consisting of alkyl of up to 18 carbon atoms, alkenyl of up to 18 carbon atoms, benzyl, chlorobenzyl, bromobenzyl, bicycloheptenylmethyl, chlorobicycloheptenylmethyl and bromobicycloheptenylmethyl, X is a halogen of atomic weight 35 to 127, $x$ is an integer of 2 to about 35 and $R_9$ is a member of the group consisting of divalent hydrocarbon groups having four to eight carbon atoms and a divalent halohydrocarbon group having four to nine carbon atoms and in which the halogen is chlorine or bromine and in which the two free valences are attached to aliphatic carbon atoms.

2. A compound according to claim 1 having the Formula (a) and where $x$ is an integer of 2 to 4 and X is a halogen of atomic weight 35 to 80.

3. A compound according to claim 2 wherein $R_8$ is alkyl and at least one of $R_1$ and $R_2$ is hydrogen.

4. A compound according to claim 3 which is a dipropylene glycol 2-haloethyl alkane phosphonate.

5. A compound according to claim 3 which is a dipropylene glycol halopropyl alkane phosphonate.

6. A compound according to claim 2 wherein $R_8$ is alkenyl and at least one of $R_1$ and $R_2$ is hydrogen.

7. A compound according to claim 6 wherein $R_8$ is a 3 to 4 carbon atom alkenyl.

8. A compound according to claim 7 which is a dipropylene glycol 2-haloethyl propene phosphonate.

9. A compound according to claim 7 which is a dipropylene glycol halopropyl propene phosphonate.

10. A compound according to claim 2 wherein $R_8$ is benzyl and at least one of $R_1$ and $R_2$ is hydrogen.

11. A compound according to claim 2 wherein $R_8$ is halobenzyl in which the halogen has an atomic weight of 35 to 80 and at least one of $R_1$ and $R_2$ is hydrogen.

12. A compound according to claim 2 wherein $R_8$ is bicycloheptenylmethyl and at least one of $R_1$ and $R_2$ is hydrogen.

13. A compound according to claim 2 wherein $R_8$ is bicycloheptenylmethyl.

14. A compound according to claim 2 wherein $R_8$ is chlorobicycloheptenylmethyl and at least one of $R_1$ and $R_2$ is hydrogen.

15. A compound according to claim 14, wherein $R_8$ is

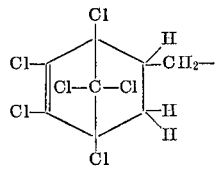

16. Dipropylene glycol 2-chloroethyl 1,4,5,6,7,7-hexachlorobicycloheptenylmethane phosphonate.

17. Dipropylene glycol chloropropyl 1,4,5,6,7,7-hexachlorobicycloheptenylmethane phosphonate.

18. A compound according to claim 1 having Formula (b) and where $x$ is an integer of 2 to 4 and X is a halogen of atomic weight 35 to 80.

19. A compound according to claim 18 wherein $R_9$ is a saturated aliphatic hydrocarbon group and at least one of $R_1$ and $R_2$ is hydrogen.

20. A compound according to claim 18 wherein $R_9$ is an unsaturated aliphatic hydrocarbon group and at least one of $R_1$ and $R_2$ is hydrogen.

21. A compound according to claim 18 wherein $R_9$ is a saturated aliphatic polyhalohydrocarbon group in which the halogen atoms have an atomic weight of 35 to 80.

22. A compound according to claim 21 wherein $R_9$ is a polyhalotetramethylene group and $-O(R_3O)_xH$ is the residue of dipropylene glycol.

23. A compound according to claim 18 wherein $R_9$ is the xylylene group.

24. A compound according to claim 18 wherein $R_9$ is the polyhaloxyylene group wherein the halogen atoms are attached to the aromatic ring and have an atomic weight of 35 to 80.

25. A compound according to claim 18 wherein $R_9$ is

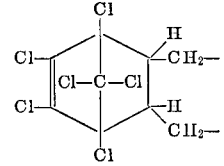

and at least one of $R_1$ and $R_2$ is hydrogen.

26. A compound according to claim 25 wherein $-O(R_3O)_xH$ is the residue of dipropylene glycol and

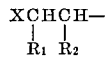

is 2-chloroethyl.

27. A compound according to claim 25 wherein $-O(R_3O)_xH$ is the residue of dipropylene glycol and

is chloropropyl.

28. Tetrachloroxylylene bis (dipropylene glycol 2-chloroethyl phosphonate).

29. Tetrachloroxylylene bis (dipropylene glycol chloropropyl phosphonate).

References Cited

UNITED STATES PATENTS 2,834,798  5/1958  Hechenbleikner et al.
                                          260—951 XR
2,957,904  10/1960  Stiles _____ 260—969 XR CHARLES B. PARKER, *Primary Examiner.*

A. H. SUTTO, *Assistant Examiner.*

U.S. Cl. X.R.

260—45.95, 953, 969, 2.5, 814, 931, 937